(12) United States Patent
Hitchman et al.

(10) Patent No.: US 10,724,877 B2
(45) Date of Patent: Jul. 28, 2020

(54) COMPACT PSEUDORANDOM SCALE AND READ HEAD FOR AN INDUCTIVE TYPE ABSOLUTE POSITION ENCODER

(71) Applicant: Mitutoyo Corporation, Kanagawa-ken (JP)

(72) Inventors: James Allen Hitchman, Seattle, WA (US); Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 484 days.

(21) Appl. No.: 15/790,703

(22) Filed: Oct. 23, 2017

(65) Prior Publication Data
US 2019/0120660 A1 Apr. 25, 2019

(51) Int. Cl.
*G01D 5/24* (2006.01)
*G01D 5/249* (2006.01)
*G01D 5/20* (2006.01)

(52) U.S. Cl.
CPC ......... *G01D 5/2497* (2013.01); *G01D 5/2053* (2013.01)

(58) Field of Classification Search
CPC ..... G01D 5/2497; G01D 5/2053; G01B 7/004
See application file for complete search history.

(56) References Cited

U.S. PATENT DOCUMENTS

| | | | |
|---|---|---|---|
| 3,882,482 A | 5/1975 | Green et al. | |
| 4,109,389 A | 8/1978 | Balcom et al. | |
| 4,414,754 A | 11/1983 | Lapeyre | |
| 4,964,727 A | 10/1990 | Huggins | |
| 5,010,655 A | 4/1991 | Rieder et al. | |
| 5,237,391 A | 8/1993 | Huggins | |
| 5,279,044 A | 1/1994 | Bremer | |
| 5,442,166 A | 8/1995 | Hollmann | |
| 5,574,445 A * | 11/1996 | Maresca | G01B 7/003 341/10 |
| 5,773,820 A | 6/1998 | Osahda et al. | |
| 5,841,274 A * | 11/1998 | Masreliez | G01D 5/2053 324/207.17 |
| 5,886,519 A | 3/1999 | Masreliez et al. | |
| 5,894,678 A | 4/1999 | Masreliez et al. | |
| 5,965,879 A | 10/1999 | Leviton | |
| 5,973,494 A | 10/1999 | Masreliez et al. | |
| 6,002,250 A | 12/1999 | Masreliez et al. | |

(Continued)

*Primary Examiner* — Tony Ko
(74) *Attorney, Agent, or Firm* — Seed IP Law Group LLP (57) ABSTRACT

An absolute position encoder comprises a scale and a detector overlaying the scale. The scale includes a periodic pattern of wavelength Wf and a code pattern having bit length Wcode. The detector includes a set of periodic pattern sensors and M sets of code pattern sensors. M is at least two. The configuration principles include: a) Wcode is larger than Wf and at most M*Wf, and b) the sets of code pattern sensors are located along the measuring axis at respective alignment positions configured such that as the code pattern moves in a single direction it moves by successive alignment intervals that are each at most Wf to align with successive alignment positions. Signal processing is provided to determine the absolute position based on the M respective sets of code detector signals and on spatially periodic signals arising in the periodic pattern sensing elements due to the periodic pattern.

14 Claims, 7 Drawing Sheets

(56) References Cited

U.S. PATENT DOCUMENTS

| | | | |
|---|---|---|---|
| 6,011,389 A | 1/2000 | Masreliez et al. | |
| 6,157,188 A | * 12/2000 | Steinke ................. | G01B 7/003 324/207.17 |
| 6,400,138 B1 | 6/2002 | Andermo | |
| 8,309,906 B2 | 11/2012 | Kapner et al. | |

* cited by examiner

Prior Art

Portion of Fig 24, pat. No. 5841274

COMPACT PSEUDORANDOM SCALE AND READ HEAD FOR AN INDUCTIVE TYPE ABSOLUTE POSITION ENCODER

BACKGROUND

Technical Field

The invention relates generally to precision measurement instruments, and particularly to absolute position encoders using inductive sensing principles.

Description of the Related Art

Various optical, capacitive, magnetic and inductive transducers, and movement or position transducers, are available. These transducers use various geometric configurations of a transmitter and a receiver in a read head to measure movement between the read head and a scale. Inductive sensors are known to be one of the sensor types that is most immune to contamination by particles, oil, water, and other fluids. U.S. Pat. No. 6,011,389 (the '389 patent), which is hereby incorporated herein by reference in its entirety, describes an induced current position transducer usable in high accuracy applications. U.S. Pat. Nos. 5,973,494 and 6,002,250, which are each hereby incorporated herein by reference in their entireties, describe incremental position inductive calipers and linear scales, including signal generating and processing circuits. U.S. Pat. Nos. 5,886,519, 5,841,274, 5,894,678, 6,400,138, and 8,309,906, which are each hereby incorporated herein by reference in their entireties, describe absolute position inductive calipers and electronic tape measures using the induced current transducer. As described in these patents, the induced current transducer may be readily manufactured using known printed circuit board technology.

Different implementations of the induced current transducer (and other types of transducers) may be implemented as either incremental or absolute position encoders. In general, incremental position encoders utilize a scale that allows the displacement of a read head relative to a scale to be determined by accumulating incremental units of displacement, starting from an initial point along the scale. However, in certain applications, such as those where encoders are used in low-power consumption devices, it is more desirable to use absolute position encoders. Absolute position encoders provide a unique output signal, or combination of signals, at each position (of a read head) along a scale. They do not require continuous accumulation of incremental displacements in order to identify a position. Thus, absolute position encoders allow various power conservation schemes, amongst other advantages. In addition to the patents referenced above, U.S. Pat. Nos. 3,882,482, 5,965, 879, 5,279,044, 5,237,391, 5,442,166, 4,964,727, 4,414,754, 4,109,389, 5,773,820 and 5,010,655, disclose various encoder configurations and/or signal processing techniques relevant to absolute encoders, and are each hereby incorporated herein by reference in their entirety.

The terms "track" or "scale track" as used herein generally refer to a region of the scale or scale pattern that extends along the measuring axis direction and has an approximately constant width and location along the direction transverse to the measuring axis. A scale track generally underlies and is aligned with a particular set of detectors during relative motion along the measuring axis direction. The detectors respond to a pattern of scale element(s) in the underlying scale track to generate position signals that depend on the detector position along the track.

A common technique for encoding the absolute (ABS) position into an encoder is to use a set of binary code scale tracks arranged parallel to an incremental or periodic scale track. To avoid position ambiguity and to use the interpolated analog measurement of the incremental or periodic scale track for high-resolution measurement, it is necessary that the binary code scale track have a spatial resolution or measurement resolution at least as fine as the spatial wavelength of the periodic scale track. In that case, each unique code value unambiguously identifies a particular adjacent periodic wavelength. Accordingly, the least significant binary track commonly has a code bit length that is equal to or smaller than the periodic wavelength of the incremental track.

In compact applications where it is desired to reduce the width of the scale transverse to the measuring axis direction, it is common to use an "N-bit" pseudorandom code, which is a serial binary code wherein each set of N adjacent code bits arranged along the measuring axis direction represents a unique position along the measuring axis direction (where N is an integer). (This is in contrast to "parallel" binary code, which uses separate code tracks for each binary digit, arranged on a wide scale along a direction transverse the measuring axis direction). For a serial binary code, moving along the measuring axis direction by one bit moves to the next code value (comprising N bits arranged along the measuring axis direction). Similarly to the binary code description above, to avoid position ambiguity and to use the interpolated analog measurement of the incremental or periodic scale track for high-resolution measurement, it is generally necessary that the pseudorandom code scale track have a spatial resolution or measurement resolution at least as fine as the spatial wavelength of the periodic scale track. In that case, each unique code value unambiguously identifies a particular adjacent periodic wavelength. Otherwise, operation may not be reliable under all circumstances, or undesirably complex readhead signal processing may be required, or the like. Accordingly, a pseudorandom scale track commonly has a code bit length (referred to as Wcode herein) that is equal to or smaller than the periodic wavelength of the incremental track (referred to as Wf herein), particularly in encoders that use inductive sensing technology. Various implementations of pseudorandom code systems in an inductive absolute encoder are described in detail in the previously incorporated U.S. Pat. No. 5,841,274, for example.

However, the known techniques of implementing binary serial code tracks (e.g., pseudorandom code tracks) in absolute encoders are not suitable or ideal for all applications. Users desire improvements to the known encoder systems outlined above to provide improved combinations of compact size, measuring range, resolution, operational robustness, reduced electronic complexity, and lower cost, in various implementations. Configurations for absolute encoders that provide such improved combinations would be desirable.

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

An electronic absolute position encoder is provided that can be implemented, for example, in a high-precision electronic digital indicator, a micrometer, a linear scale, a linear gauge, etc. It can also be adapted to various rotary implementations (e.g., wherein the measuring axis direction follows a circle or an arc, and the scale is a circular or curved track located on a rotary element).

The encoder comprises a scale extending along a measuring axis direction, a detector, and a signal processing configuration that determines an absolute position of the detector along the scale based on detector signals provided by the detector.

The scale includes signal modulating scale patterns comprising a periodic pattern and an absolute position code pattern. The periodic pattern has a spatial wavelength Wf and extends along the measuring axis direction in a periodic scale track on the scale. The absolute position code pattern has a code bit length Wcode, and extends along the measuring axis direction in a code scale track on the scale. The absolute code pattern is configured to provide an absolute code range ACR wherein each group of N consecutive code bits uniquely identifies a corresponding absolute position within the absolute code range ACR.

The detector is configured to be mounted proximate to the scale, with relative motion between the detector and scale occurring along the measuring axis direction. The detector generally includes a field generating configuration comprising at least one conductive loop that generates a changing magnetic field, and sensing elements that comprise respective conductive loops that receive at least a portion of the changing magnetic field and generate a corresponding signal that depends on the signal modulating scale patterns on an adjacent portion of the scale.

The sensing elements comprise a set of periodic pattern sensing elements and M sets of code pattern sensing elements wherein M is an integer that is at least two. The set of periodic pattern sensing elements are arranged to overlay the periodic pattern (e.g., overlaying and facing the periodic scale track) and provide a set of spatially periodic detector signals that depend on the periodic pattern on the adjacent portion of the scale, wherein each member of the set of periodic pattern sensing elements provides a respective periodic signal having a respective spatial phase. The M sets of code pattern sensing elements are arranged to overlay the absolute position code pattern (e.g., overlaying and facing the code scale track) and they provide M respective sets of code detector signals. M sets of code pattern sensing elements include at least first and second sets of code pattern sensing elements that comprise at least N members spaced along the measuring axis direction to sense at least N consecutive code bits on the adjacent portion of the scale and provide corresponding first and second sets of code detector signals.

The combination of elements outlined above are further configured as follows, according to principles disclosed herein:

Wcode is larger than Wf; and at most M*Wf;

The sets of code pattern sensing elements are located along the measuring axis direction at respective code alignment positions configured such that, as the absolute position code pattern moves in a single direction along the measuring axis relative to the detector, it moves by successive alignment intervals to align or realign with each successive alignment position, and each successive alignment interval is at most Wf.

The electronic absolute position encoder further comprises a signal processing configuration that inputs the M respective sets of code detector signals and determines the absolute position of the adjacent portion of the scale with a coarse resolution at least as fine as Wf based on the M respective sets of code detector signals, and further determines the absolute position of the adjacent portion of the scale with a fine resolution that is at least as fine as 0.1*Wf based at least on the spatially periodic detector signals. Exemplary operations or principles which may be used by the signal processing configuration are disclosed in greater detail below.

An absolute encoder system wherein Wcode is larger than Wf is unusual in pseudorandom code type absolute encoders, and particularly unusual in relation to magnetic or inductive type absolute encoders. As indicated previously, Wcode is typically equal to or smaller than the periodic wavelength Wf of the incremental track, to avoid the position ambiguity problem outlined above. However, according to principles disclosed herein, the position ambiguity problem is overcome when Wcode is larger than Wf by analyzing the signals provided by the M sets of code pattern sensing elements to determine the code position relative to the detector with a resolution that is better than Wcode. This is accomplished using the various features outlined above, according to principles described in greater detail below. Such an absolute encoder system provides certain advantages in certain implementations, and particularly in implementations where Wf is small (e.g., less than 5 mm, or 2 mm, or 1 mm, or less) and a relatively large absolute range (e.g., several tens or hundreds of times Wf) is desired, and/or implementations where reducing detector dimensions and/or code bit processing complexity or size is particularly important (e.g., inside small gauge housings, or the like). These and other advantages are explained in greater detail below.

DETAILED DESCRIPTION

Figure 1:
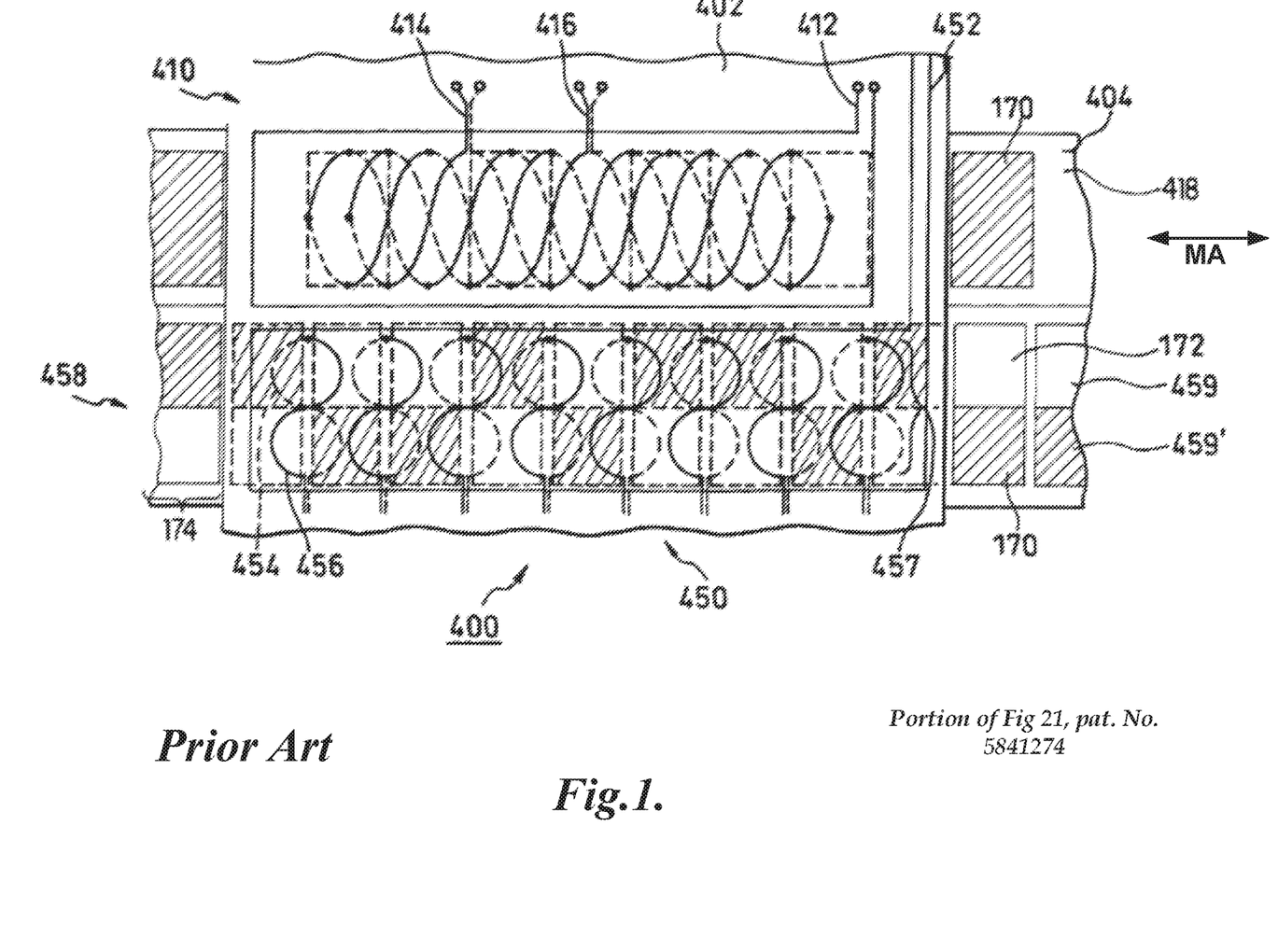
FIGS. 1 and 2 are diagrams including portions of a known absolute encoder system that uses a first known code sensing configuration.
Figure 2:
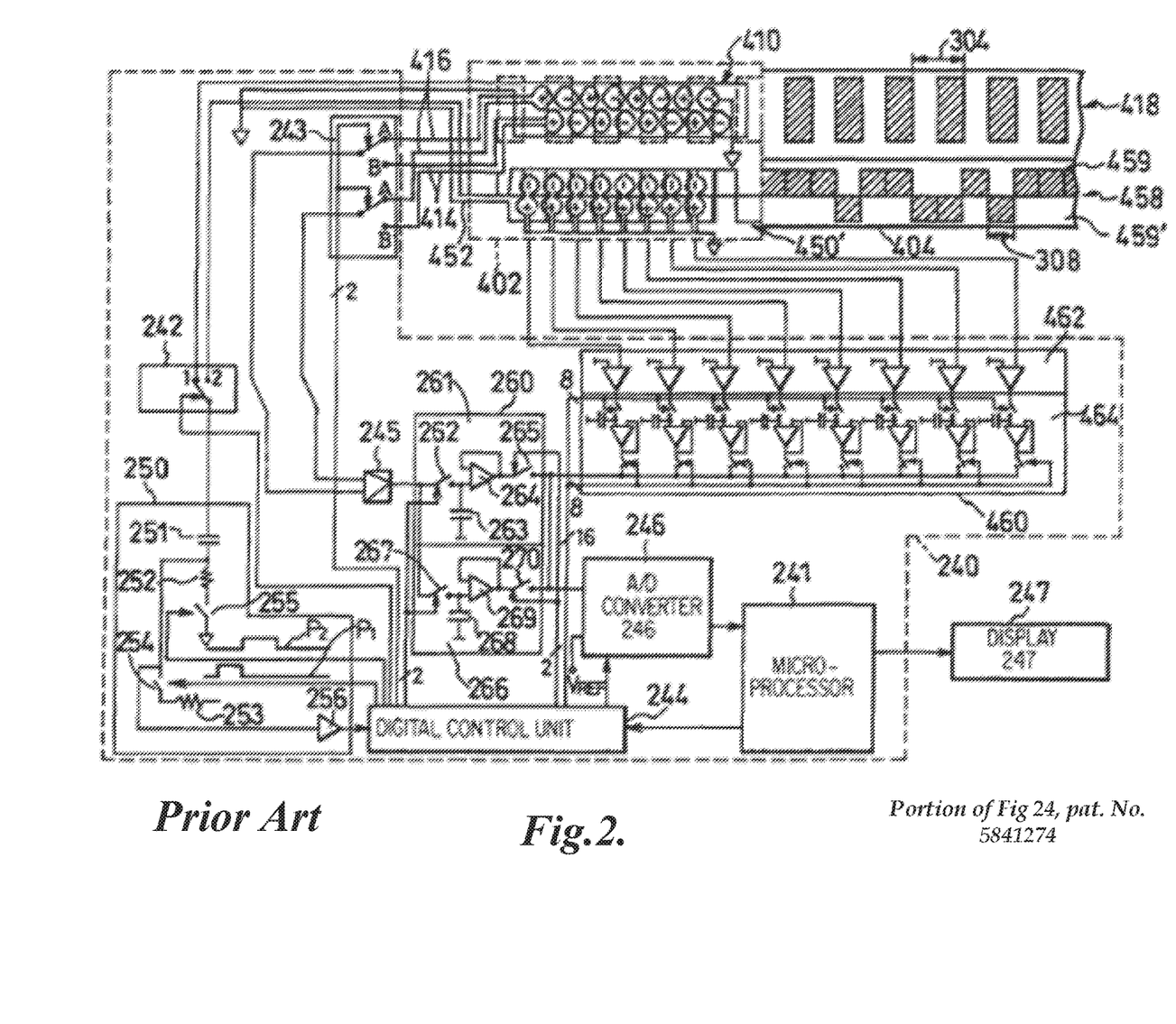

FIGS. 1 and 2 are diagrams including portions of a known inductive-type absolute encoder system 400 that uses a first known code sensing configuration. The diagrams of FIGS. 1 and 2 are disclosed in the previously incorporated U.S. Pat. No. 5,841,274 (the '274 patent). In various implementations, according to principles disclosed herein, the sensing principles and signal processing taught in the '274 patent may be used in combination with principles disclosed herein. Various aspects of the absolute encoder system 400 will be briefly summarized here. Additional associated details, explanation, and teachings are available in the '274 patent.

The encoder system 400 includes a readhead 402 (which includes a detector comprising a field generator and sensing elements described below) which is mounted proximate to a scale 404, with relative motion between the detector and scale along a measuring axis direction MA. The scale 404 extends along the measuring axis direction MA, and comprises signal modulating scale patterns. The signal modulating scale patterns comprise a periodic pattern or "fine wavelength scale" 418, having a spatial wavelength 304, extending along the direction of the measuring axis MA in a periodic scale track. The receiver windings 414 and 416 of the readhead 402 provide a set of periodic pattern sensing elements that operate in conjunction with the field generating transmitter winding 412 to provide a "fine wavelength transducer" 410. Briefly, the field generating transmitter winding 412 is driven with a changing current to generate a changing magnetic field through the receiver windings 414 and 416, which are "twisted" conductive loops that receive the changing magnetic field and ideally produce a null output in response to the changing magnetic field in the absence of the flux disruptors 170 of the periodic pattern 418. However, due to the signal modulating effect of the periodic pattern 418, the receiver windings 414 and 416 produce a spatially periodic signal that depends on the position of the adjacent periodic pattern 418. It will be appreciated that each of the receiver windings 414 and 416 produces a respective periodic signal having a respective spatial phase, due to their different locations on the readhead 402 (e.g., to provide quadrature signals in the illustrated implementation, as is known in the art).

The signal modulating scale patterns further comprise an absolute position code pattern or "binary code scale" 458, extending along the direction of the measuring axis MA in a code scale track. The code pattern 458 has a code bit length along the measuring axis MA which approximately coincides with the edge-to-edge distance 308, in various implementations. The code bit length is sometimes referred to as the code bit length Wcode in the following description.

Balanced pairs 457 of the readhead 402 provide a set of code pattern sensing elements that operate in conjunction with the field generating transmitter winding 452 to provide a binary code transducer 450. In the illustrated implementation, an N-bit binary code is used where N=8. Briefly, the field generating transmitter winding 452 is driven with a changing current to generate a changing magnetic field through the 8 balanced pairs 457, which are "twisted" conductive loops (each comprising a positive polarity loop 454 and a negative polarity loop 456) that receive the changing magnetic field and ideally produce a null output in response to the changing magnetic field in the absence of the flux disruptors 170 of the absolute position code pattern 458. However, due to the signal modulating effect of the absolute position code pattern 458, the set of eight code pattern sensing elements (that is, the set of eight balanced pairs 457) produce a corresponding set of code detector signals that depends on the N consecutive code bits on the adjacent portion of the absolute position code pattern, or "binary code scale" 458. In the illustrated implementation the binary code scale 458 includes an upper portion 459 and a lower portion 459'. As shown, for each code bit a flux modulator or disruptor 170 may be located in one of the upper or lower portions, and may be omitted in other portions, to create a signal of the desired polarity in the overlaying balanced pair 457. A positive voltage (e.g., above a threshold or reference level) may correspond to a logical "1," and a negative voltage may correspond to a logical "0."

FIG. 2 shows an exemplary implementation of the signal generating and processing circuit 240 connected to the read head 402. In FIG. 2, those elements having the same number as in FIG. 1 may be similar or identical, and may be understood based on previous description. Various aspects of the signal generating and processing circuit 240 will be briefly summarized here. Additional associated details, explanation, and teachings are available in the '274 patent.

Briefly, regarding the fine wavelength transducer 410, the signal generator 250 drives the field generating transmitter winding 412 as outlined previously. The resulting signal in the receiver windings 414 or 416 may be selected by the switch 243 and amplified by the preamplifier 245, input to a sample and hold circuit 260, and converted by the A/D converter 246. The microprocessor 241 may then analyze the spatially periodic signal values and their relationship according to known quadrature signal processing methods to provide a high-resolution interpolated position measurement within a local spatial wavelength 304 that is indicated by the binary code transducer 450 (or 450'), as described further below.

Briefly, regarding the binary code transducer 450, the signal generator 250 drives the field generating transmitter winding 452 as outlined previously. In the illustrated implementation, either the transmitter winding 412 or 452 is selected by operation of the switch 242 under control of the digital control unit 244. However, in other implementations, as indicated in the '274 patent, a single transmitter winding may be configured for use by both the transducers 410 and 450 (or 450'). In any case, the resulting eight signals in the balanced pairs 457 of the binary code transducer 450 (or 450') may be input to a sample and hold circuit 460, amplified by preamplifiers 262, and simultaneously captured by the sample and hold circuits 464. The digital control unit 244 may subsequently select the sampled signals by controlling the various switches in the sample and hold circuit 460, as illustrated, so that each signal may be converted by the A/D converter 246. The microprocessor 241 may then analyze the various code bit signal values (e.g., by comparing them to a binary signal threshold value) and use predetermined logic to analyze the relationship between the code bit values, to determine the corresponding absolute position code word. The '274 patent teaches various alternative methods of using such code bit signal values and/or their logical relationships to identify a particular absolute position along the measuring axis MA relationship, with a resolution of 1 code bit length. Therefore, it is not necessary to repeat such methods here. However, it is noteworthy that in all cases in the '274 patent, it is taught that the resolution of the absolute position code (that is, its code bit length) is not larger than, and is preferably less than, the spatial wavelength 304 of the periodic pattern of "fine wavelength scale" 418.

Otherwise, the absolute code will not unambiguously correspond to a particular wavelength or period of the fine wavelength scale 418, resulting in a potential position error or uncertainty of one wavelength, despite the sub-wavelength resolution which is provided by the fine wavelength transducer 410. In the preferred example illustrated in FIGS. 1 and 2, the code bit length or edge-to-edge distance 308 is only one-half the spatial wavelength 304, to provide an error margin and unambiguously associate a particular absolute position code with a particular period of the spatial wavelength 304, despite potential signal measurement errors, or the like. Under the conditions outlined above, the '274 patent teaches that coarse resolution absolute position code may be combined with a high-resolution interpolated position measurement within a particular period of the spatial wavelength 304, to provide a high-resolution absolute position measurement, as will be readily understood by one of ordinary skill in the art.

The teachings of the '274 patent recognize one potential problem with the code sensing arrangement shown in FIGS. 1 and 2. In particular, when the eight balanced pairs 457 are aligned at an intermediate position between code elements of the binary code scale 458, as shown in FIG. 1, then the signal value of a balanced pair 457 at a transition between code values may produce a "null" or undefined signal value. For example, the first, third, fourth, seventh and eighth balanced pairs 457 from the left in FIG. 1 exemplify this condition. The '274 patent teaches that one solution to this problem may be obtained by excluding certain code values corresponding to "no code value transitions" and "all code value transitions" between the adjacent code bits in a code word. In such a case, it is possible to logically decode all code values along the scale, despite the occurrence of various undefined signal values at various positions. However, this may be impractical or unreliable for various reasons in various applications. Therefore, the '274 patent also teaches the solution outlined below with reference to FIG. 3.

Figure 3:
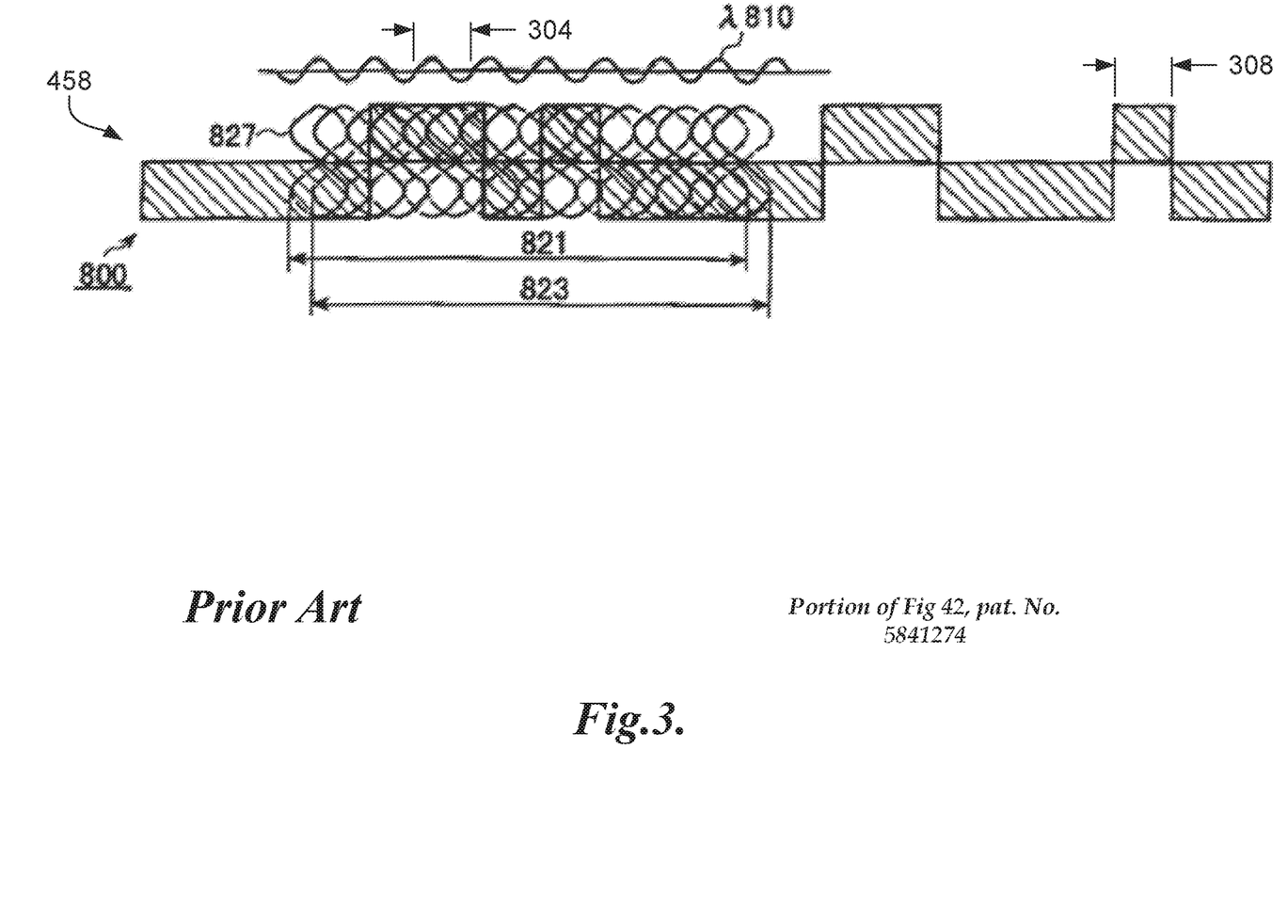
FIG. 3 is a diagram showing certain aspects of a second known code sensing configuration usable in a variation of the absolute encoder system shown in FIGS. 1 and 2.

FIG. 3 is a diagram showing certain aspects of a second known code sensing configuration usable in an absolute encoder system 800, which may be a variation of the absolute encoder system shown in FIGS. 1 and 2, in some implementations. The diagram of FIG. 3 is disclosed in the previously incorporated '274 patent, for solving the problem outlined above, wherein the signal value of one or more balanced pairs 827 (similar or identical the balanced pair 457, described above) at a transition between code values (e.g., in the binary code scale 458) may produce a "null" or undefined signal value. The periodic signal λ810 may be taken to represent the periodic spatial phase position along the periodic pattern of the fine scale 418 shown in FIGS. 1 and 2. As shown in FIG. 3, the code bit length or edge-to-edge distance 308 may be assumed to be equal to (or less than) the spatial wavelength 304. As described in the '274 patent, in the binary scale transducer shown in FIG. 3, the code sensing configuration includes a first set 821 of balanced pairs 827 and a second set 823 of balanced pairs 827. In particular, the first set 821 and the second set 823 are offset by one-half of the code bit length or edge-to-edge distance 308. Thus, if one of the sets 821 or 823 is positioned at transitions between the code scale elements (e.g., as illustrated in FIG. 1), the other set 821 or 823 will be aligned with the code scale elements. Thus, while one of the sets 821 or 823 may have undefined code signals, the other set 821 or 823 will have all its code signals sufficiently defined.

The '274 patent also indicates the method to be used for determining which of the sets 821 or 823 should be used at any particular position. Basically, the '274 patent indicates that a fine wavelength transducer (e.g., the fine wavelength transducer 410, shown in FIGS. 1 and 2) can be used to determine which one of the sets 821 or 823 should be used. In the illustrated example, where the fine wavelength 304 is assumed to be equal to the code bit length or edge-to-edge distance 308, then when the voltage amplitude of one of the receiver windings (e.g., the receiver windings 414 or 416 shown in FIGS. 1 and 2) is positive, a first one of the sets 821 or 823 should be used. In contrast, when the amplitude of that receiver winding is negative, the other one of the sets 821 or 823 should be used. The '274 patent does not teach any other method of determining which of the sets 821 or 823 should be used.

Figure 4:
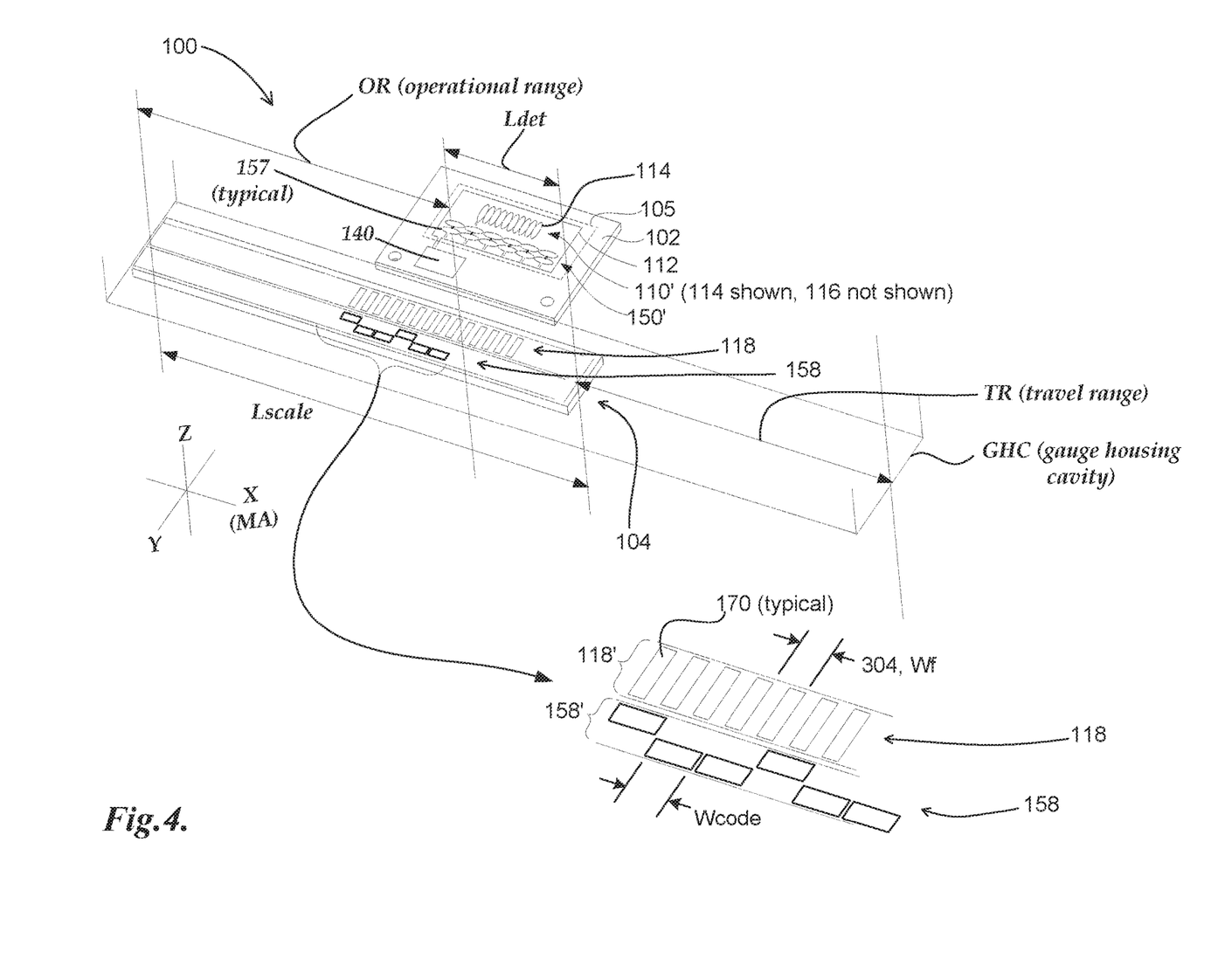
FIG. 4 is a partially schematic isometric view showing certain features and parameter relationships in an absolute encoder system, to illustrate various problems that may be associated with prior art designs and code sensing configurations shown in FIGS. 1-3 in certain implementations, in contrast to certain advantages that may be provided according to various principles disclosed herein.

FIG. 4 is a partially schematic isometric exploded view showing certain features and parameter relationships in an absolute encoder system 100, to illustrate various problems that may be associated with the prior art designs and code sensing configurations shown in FIGS. 1-3 in certain implementations, in contrast to certain advantages that may be provided if the absolute encoder system 100 incorporates various features according to principles disclosed herein. It will be appreciated that certain pattern dimensions (e.g., Wcode Wf) are exaggerated for purposes of illustration.

The illustrated absolute encoder system 100 includes a readhead 102, which includes a signal processing circuit or configuration 140, a detector 105 comprising a field generating transmitter winding 112, periodic pattern sensing elements 110' and code pattern sensing elements 150' (described below), which detector 105 is mounted proximate to a scale 104, with relative motion between the detector 105 and scale 104 along a measuring axis direction MA. The scale 104 extends along the measuring axis direction MA, and comprises signal modulating scale patterns. The signal modulating scale patterns comprise a periodic pattern 118 (only a portion of which is shown in FIG. 4) having a spatial wavelength 304 extending along the direction of the measuring axis MA in a periodic scale track 118'. The periodic pattern sensing elements 110' comprise the receiver windings 114 and 116 of the readhead 102 which provide a set of two periodic pattern sensing elements that operate in conjunction with the field generating transmitter winding 112 to provide a fine wavelength measurement, as previously outlined with reference to the analogous elements in FIGS. 1 and 2. Briefly, the field generating transmitter winding 112 is driven with a changing current to generate a changing magnetic field through the receiver windings 114 and 116, which are "twisted" conductive loops (arranged similarly or identical to the receiver windings 414 and 416 shown in FIGS. 1 and 2) that receive the changing magnetic field and ideally produce a null output in response to the changing magnetic field in the absence of the flux disruptors 170 of the periodic pattern 118. However, due to the signal modulating effect of the periodic pattern 118, the receiver windings 114 and 116 produce a spatially periodic signal that depends on the position of the adjacent periodic pattern 118. It will be appreciated that each of the receiver windings 114 and 116 (116 not shown) is configured to produce a respective periodic signal having a respective spatial phase, due to their different locations along the readhead 102 (e.g., to provide "quadrature" signals, as illustrated for the analogous elements in FIGS. 1 and 2, and as is known in the art).

The signal modulating scale patterns further comprise an absolute position code pattern 158 (only a portion of which is shown in FIG. 4), extending along the direction of the measuring axis MA in a code scale track 158'. The code pattern 158 has a code bit length Wcode along the measuring axis MA. The code pattern sensing elements 150' may comprise at least first and second sets of N code pattern sensing elements, for sensing an N bit code word. One such set, with N=6, is shown in FIG. 4. Additional sets of code pattern elements are not shown in FIG. 4, for clarity of illustration. However, it will be understood that at least a second set is generally included (e.g., in a configuration analogous to that shown in FIG. 3, including the first and second sets 821 and 823). More generally, the code pattern sensing elements 150' may include M sets of code pattern sensing elements arranged to overlay the absolute code position pattern 158, and provide M sets of code detector signals, where M is an integer that is at least two. In various implementations, each code sensing element 157 may be analogous to the balanced pair 457 shown in FIGS. 1 and 2. The M respective sets of code pattern sensing elements are arranged to overlay the absolute code position pattern 158, and operate in conjunction with the field generating transmitter winding 112 to provide M sets of code detector signals that depend on the N consecutive code bits on the adjacent portion of the absolute position code pattern 158, according to previously outlined principles.

Various parameter relationships in a practical implementation of the absolute encoder system 100 will now be described. A gauge housing cavity or opening GHC is schematically represented in FIG. 4. It will be understood that in various implementations it may be a requirement that the scale 104 and readhead 102 are located or sealed in the gauge housing cavity GHC. It is often a practical requirement that the dimension of the gauge housing and the gauge housing cavity be minimized (e.g., in dial gauges or linear gauges, or the like). The scale is typically mounted to a bearing system and guided along the measure axis direction MA inside the gauge housing cavity GHC. Thus, the measuring range in such a gauge is at most the travel range TR shown in FIG. 4, which is the difference between the dimension of gauge housing cavity GHC along the measuring axis direction MA, and the overall scale length Lscale. The measuring range in such a gauge is furthermore at most the operational range OR shown in FIG. 4, which is the difference between the overall scale length Lscale and the required detector length Ldet. Thus, for a given dimension of the gauge housing cavity GHC and scale length Lscale, decreasing the detector length Ldet will increase the usable measuring range of the gauge—which is a very desirable characteristic of a gauge. In various implementations, it may be desirable if Ldet is at most 20 millimeters, or 16 millimeters, or even less.

However, the foregoing also assumes that the absolute code range ACR provided by the N-bit absolute code position pattern 158 is not the limiting factor. That is, it is also a requirement that the N-bit absolute code position pattern 158 provide an absolute code range ACR that equals or exceeds the desired usable measuring range of the gauge. In general, the approximate absolute code range ACR of an N-bit code of the type described herein is approximately $ACR \cong (2^N-1)*Wcode$, which indicates that increasing the number of bits in the code, and/or increasing Wcode, provides the means to increase the absolute code range ACR.

However, in some applications, it may be undesirable to increase the number of code bits N. For example, in various implementations, the connections and/or circuitry available to process code sensor signals in the signal processing configuration 140 may be limited by practical considerations such as space, cost, or the allowable measurement sample processing time. For example, in some applications it has been found that it may be desirable to use N bit codes, wherein N=6 or less. Further exacerbating the problem, in gauge applications such as that represented in FIG. 4, the spatial wavelength 304 (also referred to as the fine spatial wavelength Wf below) of the periodic pattern may be limited by the need to provide high resolution and accuracy (e.g., on the order of 10 micrometers, or 5 micrometers, or even 1 micrometer or less). In such a case, given practical signal interpolation levels, the spatial wavelength may be limited to 2 millimeters, or 1 millimeter, or even less. In such a case, the sets of code detector signals must provide a resolution and accuracy better than these small spatial wavelengths. The '274 patent and other known absolute encoder systems teach that this is accomplished by making Wcode equal to or less than the spatial wavelength 304 (that is, Wf), which is generally contemplated as being on the order of 5 millimeters in the '274 patent. However, for a spatial wavelength Wf of 1 millimeter, this means that the teachings of the '274 patent and other known absolute encoders systems indicate that the absolute code range ACR for a 6-bit code is approximately 64 millimeters, which is too small for a wide range of applications, and is therefore generally unacceptable.

FIG. 4 indicates a solution to the problem outlined above. In particular, FIG. 4 shows a dimension for Wcode which is greater than the spatial wavelength Wf, in contradiction to the teachings of the '274 patent and other known absolute encoder systems that use magnetic or inductive type sensing technology. In the particular implementation illustrated in FIG. 4, $Wcode \cong 1.5*Wf$. This particular implementation may be used with a Wf=1 millimeter, and increase the absolute code range ACR for a 6-bit code to approximately 96 millimeters, which is sufficient for a wide range of applications. However, this is illustrative only, and not limiting. More generally, according to principles described in greater detail below, an absolute position encoder which uses conductive loops as sensors as disclosed and claimed herein is configured such that Wcode is larger than Wf (e.g., 1.25 Wf, or 1.5 Wf, or 2 Wf, of more), and at most M*Wf, when using M sets of code pattern sensing elements. Various considerations relating to the arrangements of the M sets of code pattern sensing elements and the related signal processing, to overcome the deficiencies and constraints of the prior art and allow the use of a configuration wherein Wcode is larger than Wf, are described in greater detail below.

Figure 5:
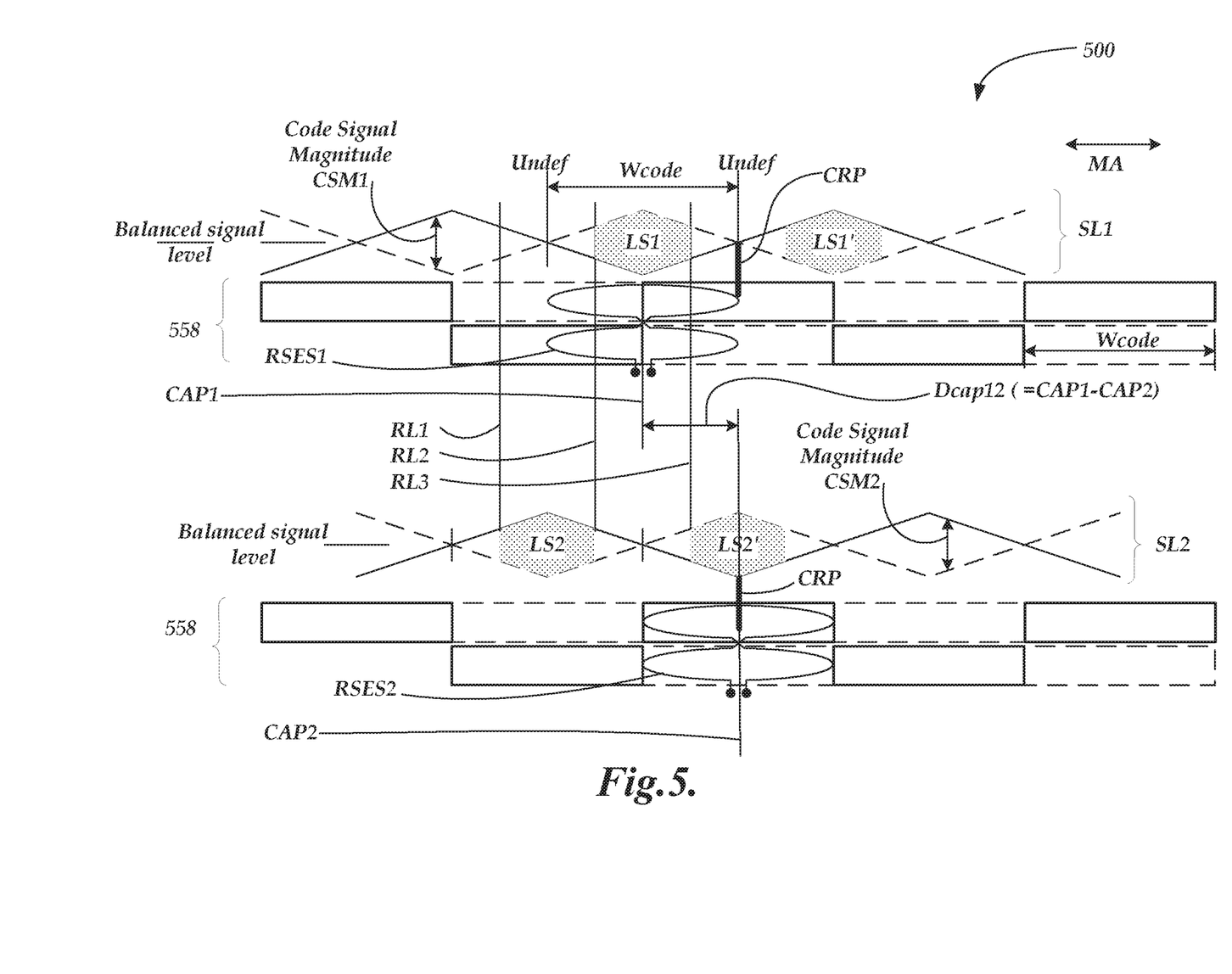
FIG. 5 is a schematic representation illustrating certain aspects of how a digital position code may be sensed and processed according to principles disclosed herein, to resolve the coded position with a resolution that is more accurate than the resolution provided by the code bit length, in a first implementation that uses two sets of code pattern sensing elements.

FIG. 5 is a schematic representation 500 illustrating certain aspects of how a digital position code may be sensed and processed according to principles disclosed herein, to resolve the coded position with a resolution that is more accurate than the resolution provided by the code bit length Wcode. FIG. 5 represents a first implementation that uses two sets of code pattern sensing elements (that is, M=2). Each set of code pattern sensing elements is represented by a single one of its members. The first set of code pattern sensing elements is represented by the representative sensing element of set one RSES1. The second set of code pattern sensing elements is represented by the representative sensing element of set two RSES2.

According to the principles of this disclosure, the M sets of code pattern sensing elements are located along the measuring axis direction at respective code alignment positions (CAP) configured such that as the absolute position code pattern moves in a single direction along the measuring axis relative to the detector it moves by successive alignment intervals to align or realign with each successive alignment position, and each successive alignment interval is at most Wf. This principle is represented in FIG. 5, by the respective code alignment position CAP1, which is indicated at a reference position that is the midline of the representative sensing element RSES1, and the respective code alignment position CAP2, which is indicated at a reference position that is the midline of the representative sensing element RSES2. As shown in FIG. 5, these code alignment positions are different by an alignment interval Dcap12, which is the interval over which the absolute position code pattern 558 must move in order to move from alignment at CAP1 to alignment at CAP2. In general, a successive alignment interval Dcap21 may also be defined, associated with the absolute position code pattern 558 continuing to move in the same direction from alignment at CAP2 to alignment at CAP1. In the particular implementation illustrated in FIG. 5, Dcap12 is equal to Wcode/2, and Dcap12=Dcap21. However, in various other implementations Dcap12 may be different from Dcap21, so long as both alignment intervals are no larger than Wf.

It will be understood that, in practice, the representative sensing elements RSES1 and RSES2, and the respective sets of sensing elements that they represent, may be overlapped or interleaved along the measuring axis direction on a readhead (e.g., in a manner analogous to that illustrated in FIG. 3 for the sensor element sets 821 and 823). They are separated in FIG. 5 only for the sake of more clearly illustrating the operating principles described here. Same is true for the absolute position code pattern 558, which should be understood to represent the same and only code pattern on a scale. As such, the absolute position code pattern 558 illustrated in FIG. 5 is located at the same position along the measuring axis direction MA in each of its representative instances. For purposes of illustration, the illustrated absolute position code pattern 558 comprises only code bit values that alternate along the measuring axis direction MA. It will be understood that various code words may have adjacent code bits that are the same. However, as previously indicated herein, an absolute position code pattern should generally have at least one transition between adjacent code bits in each code word. Therefore, the illustrated absolute position code pattern 558 is useful for illustrating important principles related to such a code.

The illustrated signal level SL1 (or SL2) is representative of a code signal magnitude at various relative positions between the representative sensing elements RSES1 (or RSES2) and the absolute code pattern 558 along the measuring axis direction MA. In order to more easily compare representative code signal magnitudes CSM1 and CSM2 at any position, a solid line in SL1 (or SL2) is indicative of the signal resulting from the illustrated polarity of the code bits of the absolute position code pattern 558, whereas the dashed line in SL1 (or SL2) is indicative of a signal that would result from an inverted polarity of code bits, in comparison to that illustrated by the absolute code position pattern 558, and the "doubled" code signal magnitudes CSM1 and CSM2 are indicated therebetween. Due to the alignment interval Dcap12 being equal to Wcode/2, the response of the signal levels SL1 and SL2 of the representative sensing elements RSES1 and RSES2 are shifted relative to one another by this same amount as the absolute position code pattern 558 is moved along the measuring axis direction MA. An exemplary code reference position CRP is indicated in FIG. 5. At this code reference position CRP, the representative sensing element RSES1 is located on the transition between the code elements, and therefore outputs a balanced or undefined signal magnitude "Undef." The distance between such signal magnitudes Undef is Wcode, as shown. In contrast, at this code reference position CRP, the representative sensing element RSES2 is aligned directly over a code element, and outputs the largest possible signal magnitude. As shown in FIG. 5, the signal levels SL1 and SL2 undergo a full cycle between these signal magnitudes over a distance Wcode.

FIG. 5 also shows that between a code position represented by the reference line RL1 and a code position represented by the reference line RL2, the signal magnitude of the representative sensing element RSES2 will be larger than that of the representative sensing element RSES1, as represented by the shaded larger signal magnitude region LS2 (which repeats periodically at a position change of Wcode, as shown by larger signal magnitude region LS2', and so on). Similarly, between a code position represented by the reference line RL2 and a code position represented by the reference line RL3, the signal magnitude of the representative sensing element RSES1 will be larger than that of the representative sensing element RSES2, as represented by the shaded larger signal magnitude region LS1 (which repeats periodically at a position change of Wcode, as shown by larger signal magnitude region LS1', and so on).

Accordingly, it will be understood that, for this implementation, if signal processing is performed to determine which of the first and second sets of sensing elements (represented by the representative sensing elements RSES1, and RSES2) exhibits the largest signal magnitude(s), then the absolute code position may be determined with a resolution of approximately Wcode/2 (in the case of for ideal or nearly ideal signals), as indicated by the position resolution or length along the measuring axis direction MA of the larger signal magnitude regions LS1 and/or LS2. Exemplary operations or principles which may be used by the signal processing configuration to determine which set of sensing elements exhibits the largest signal magnitude(s) are described further below.

As previously indicated, each alignment interval (e.g., Dcap12, Dcap21) may be at most Wf (or preferably somewhat less, to provide a more robust error margin) in various implementations according to this disclosure. Accordingly, for this particular implementation, Wcode is greater than Wf, and may be at most 2*Wf, or preferably somewhat less. As previously noted, an absolute encoder system wherein Wcode is larger than Wf is unusual in pseudorandom code type absolute encoders, and particularly unusual in relation to the use of such codes in magnetic or inductive type absolute encoders.

Figure 6:
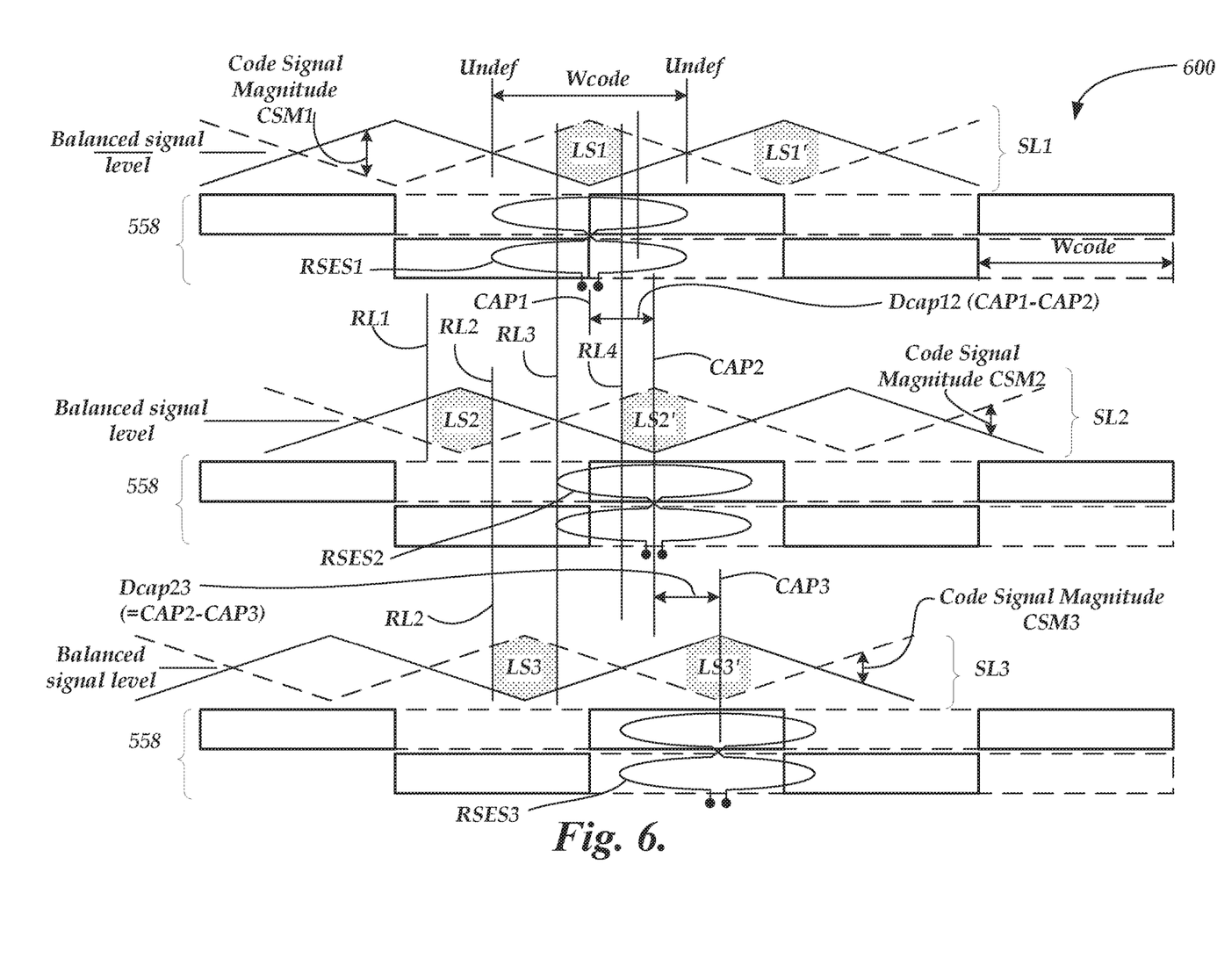
FIG. 6 is a schematic representation illustrating certain aspects of how a digital position code may be sensed and processed according to principles disclosed herein, to resolve the coded position with a resolution that is more accurate than the resolution provided by the code bit length, in a second implementation that uses three sets of code pattern sensing elements.

FIG. 6 is a schematic representation 600 that illustrates certain aspects of how a digital position code may be sensed and processed according to principles disclosed herein, to resolve the coded position with a resolution that is more accurate than the resolution provided by the code bit length Wcode. FIG. 6 is substantially similar to FIG. 5 and may be understood by analogy. Therefore, only significant differences will be described here.

FIG. 6 is similar to FIG. 5, except it represents a second implementation that uses three sets of code pattern sensing elements (that is, M equals three) instead of two sets as in FIG. 5. Similarly to FIG. 5, each set of code pattern sensing elements is represented by a single one of its members, RSES1, RSES2, and RSES3, respectively. According to the principles of this disclosure, the M sets of code pattern sensing elements are located along the measuring axis direction at respective code alignment positions (CAP)

configured such that as the absolute position code pattern moves in a single direction along the measuring axis relative to the detector it moves by successive alignment intervals to align or realign with each successive alignment position, and each successive alignment interval is at most Wf. This principle is represented in FIG. 6 by the respective code alignment positions CAP1, CAP2 and CAP3, which are indicated at a reference position that is the midline of the corresponding representative sensing elements RSES1, RSES2, and RSES3, respectively. As shown in FIG. 6, CAP1 and CAP2 are different by an alignment intervalDcap12, and CAP2 and CAP3 are different by an alignment intervalDcap23. In this particular implementation illustrated in FIG. 6, Dcap12=Dcap=Wcode/3. Dcap12 is the interval over which the absolute position code pattern 558 must move in order to move from alignment at CAP1 to alignment at CAP2. Dcap23 is the interval over which the absolute position code pattern 558 must move in order to move from alignment at CAP2 to alignment at CAP3. In general, a successive alignment interval Dcap31 may also be defined, associated with the absolute position code pattern 558 continuing to move in the same direction from alignment at CAP3 to realignment of a successive code bit or word at CAP1, and so on. In the particular implementation illustrated in FIG. 6, Dcap12=Dcap23=Dcap31=Wcode/3. However, in various other implementations all alignment intervals need not be the same, so long as each alignment intervals is no larger than Wf.

It will be understood that, in practice, the representative sensing elements RSES1, RSES2 and RSES3, and the respective sets of sensing elements that they represent, may be overlapped or interleaved along the measuring axis direction on a readhead (e.g., in a manner analogous to that illustrated in FIG. 3 for the sensor element sets 821 and 823), overlaying a single absolute position code pattern 558. They are separated in FIG. 5 only for the sake of more clearly illustrating the operating principles described here. The absolute position code pattern 558 should be understood to represent the same and only code pattern on a scale.

The illustrated signal levels SL1, SL2, and SL3, and the indicated code signal magnitudes are analogous to those illustrated in FIG. 5. Due to the alignment intervalsDcap12 and Dcap23 being equal to Wcode/3, the response of the signal levels SL1, SL2 and SL3 of the representative sensing elements RSES1, RSES2 and RSES3 are shifted relative to one another by those same amounts as the absolute position code pattern 558 is moved along the measuring axis direction MA. As a result, FIG. 6 shows that between a code position represented by the reference line RL1 and a code position represented by the reference line RL2, the signal magnitude of the representative sensing element RSES2 will be larger than that of the representative sensing elements RSES1 and RSES3, as represented by the shaded larger signal magnitude region LS2 (which repeats periodically at a position change of Wcode, as shown by larger signal magnitude region LS2', and so on.). Similarly, between a code position represented by the reference line RL2 and a code position represented by the reference line RL3, the signal magnitude of the representative sensing element RSES3 will be larger than that of the representative sensing elements RSES1 and RSES2, as represented by the shaded larger signal magnitude region LS3 (which repeats periodically at a position change of Wcode, as shown by larger signal magnitude region LS3', and so on.) Similarly, between a code position represented by the reference line RL3 and a code position represented by the reference line RL4, the signal magnitude of the representative sensing element RSES1 will be larger than that of the representative sensing elements RSES2 and RSES3, as represented by the shaded larger signal magnitude region LS1 (which repeats periodically at a position change of Wcode, as shown by larger signal magnitude region LS1', and so on.)

Accordingly, it will be understood that, for this implementation, if signal processing is performed to determine which of the first, second and third sets of sensing elements (represented by the representative sensing elements RSES1, RSES2 and RSES3) exhibits the largest signal magnitude(s), then the absolute code position may be determined with a resolution of approximately Wcode/3 (in the case of for ideal or nearly ideal signals), as indicated by the position resolution or length along the measuring axis direction MA of the larger signal magnitude regions LS1, LS2 and/or LS3. In various implementations, the set exhibiting the largest signal magnitude may be determined by comparing its summed absolute signal values, or summed squared signal values, or the like. However, these methods of comparison are exemplary only, and not limiting.

Figure 7:
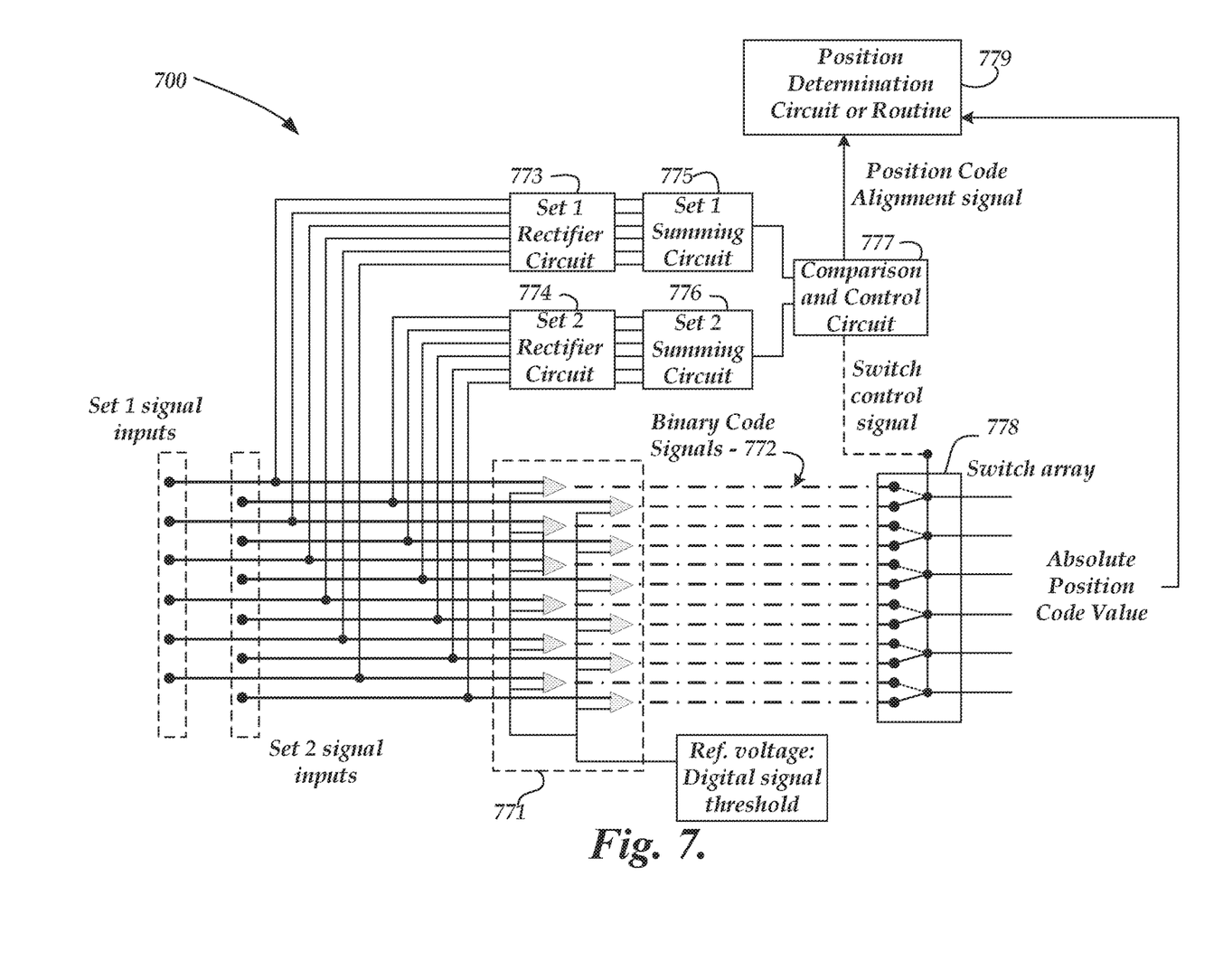
FIG. 7 is a block diagram of exemplary components of one implementation of a signal processing configuration illustrating certain aspects of how a digital position code may be sensed and processed according to principles disclosed herein to resolve the coded position with a resolution that is more accurate than the resolution provided by the code bit length.

FIG. 7 is a block diagram 700 of exemplary components of one implementation of a signal processing configuration illustrating certain aspects of how a digital position code may be sensed and processed according to principles disclosed herein in order to resolve the coded position with a resolution that is more accurate than the resolution provided by the code bit length.

As shown in FIG. 7, the signal processing configuration inputs the M respective sets of N code detector signals (in the illustrated implementation M=2, N=6) corresponding to first and second sets of code detector signals input at Set1 signal inputs and Set2 signal inputs, respectively. The signals may be generated from first and second sets of code pattern sensing elements (e.g., Set1 and Set2, respectively) according to previously outlined principles (e.g., the signals may be provided in a manner analogous to those provided on the sample and hold circuits 464, as described with reference to FIG. 2). The signals may then be routed along two parallel signal paths. One path leads to an array of comparators 771, which compare the signals to a digital signal reference voltage, and digitize the signals into binary code signals 772. Along the other path, the Set1 signals are routed to a Set1 rectifier circuit 773 and the Set2 signals are routed to a Set2 rectifier circuit 774. The rectifier circuits 773 and 774 output the magnitudes of the Set1 and Set2 signals to a Set1 summing circuit 775 and a Set2 summing circuit 776, respectively. Set1 summing circuit 775 and Set2 summing circuit 776 output their Set1 and Set2 summation signals to a comparison and control circuit 777, which determines which of the signals is larger according to known methods. The comparison and control circuit 777 then outputs a switch control signal that is based on that determination to a switch array 778, and a position code alignment signal that is based on that determination to an absolute position determination circuit or routine 779. For example, if the Set1 summation signal is larger, then the switch control signal that is sent to the switch array 778 causes it to output binary code signals corresponding to Set1 as the absolute position code value, which is then sent to the absolute position determination circuit 779. The position code alignment signal sent to the position determination circuit or routine 779 by the comparison and control circuit 777 is a signal that, in this case, indicates that Set1 has provided the absolute position code value, which causes the position determination circuit or routine 779 to associate the code alignment position of the Set1 set of code pattern sensing elements with that (Set1) absolute position code value. In contrast if the Set2 summation signal is larger, then the switch control signal that is sent to the switch array 778 causes it to output binary code signals corresponding to Set2 as the absolute position code value, which is then sent to the absolute position determination circuit 779. The position code alignment signal sent to the position determination circuit or routine 779 by the comparison and control circuit 777 is a signal that, in this case, indicates that Set2 has provided the absolute position code value, which causes the position determination circuit or routine 779 to associate the code alignment position of the Set2 set of code pattern sensing elements with that (Set2) absolute position code value. In either case, the position determination circuit or routine 779 is configured to input the absolute code position value and the code alignment position of the corresponding set of code pattern sensing elements, and determine the absolute position of the portion of the scale adjacent to the detector (e.g., the detector 105, described with reference to FIG. 4). When the sets of code pattern sensing elements are configured according to the principles disclosed previously herein, then the position determination circuit or routine 779 can determine that absolute position with a coarse resolution at least as fine as Wf, based on the corresponding sets of code detector signals. Since this is sufficient to indicate the absolute position within a particular period of the wavelength Wf of the periodic pattern on the adjacent portion of the scale, the position determination circuit or routine 779 may then further determine the absolute position of the adjacent portion of the scale with a fine resolution that is at least as fine as 0.1*Wf based on the spatially periodic detector signals, according to known methods.

It will be appreciated that although the signal processing configuration shown in FIG. 7 is for an implementation using signals provided by two sets of sets of code pattern sensing elements (that is, M=2), it may be adapted in a straightforward manner to process signals from additional sets of code pattern sensing elements by replicating the rectification and summing signal paths in implementations wherein M is 3 or 4, or more.

It should be appreciated that the principles outlined above may be applied to a variety of other embodiments. Various embodiments described above can be combined to provide further embodiments. All the U.S. patents referred to in this specification are incorporated herein by reference, in their entirety. Aspects of the embodiments can be modified, if necessary to employ concepts of the various patents, to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled.

The invention claimed is:

1. An electronic absolute position encoder, comprising:
   a scale extending along a measuring axis direction and including signal modulating scale patterns comprising:
      a periodic pattern having a spatial wavelength Wf extending along the measuring axis direction in a periodic scale track on the scale; and
      an absolute position code pattern having a code bit length Wcode along the measuring axis direction extending along the measuring axis direction in a code scale track on the scale, wherein the absolute position code pattern is configured to provide an absolute code range ACR wherein each group of N consecutive code bits uniquely identifies a corresponding absolute position within the absolute code range ACR,
   a detector configured to be mounted proximate to the scale with relative motion between the detector and the scale along the measuring axis direction, the detector including a field generating configuration comprising at least one conductive loop that generates a changing magnetic field, and sensing elements that comprise respective conductive loops that receive at least a portion of the changing magnetic field and generate a corresponding signal that depends on the signal modulating scale patterns on an adjacent portion of the scale, the sensing elements comprising:
      a set of periodic pattern sensing elements arranged to overlay the periodic pattern and provide a set of spatially periodic detector signals that depend on the periodic pattern on the adjacent portion of the scale, wherein each member of the set of periodic pattern sensing elements provides a respective periodic signal having a respective spatial phase; and
      M sets of code pattern sensing elements arranged to overlay the absolute position code pattern and provide M respective sets of code detector signals, wherein M is an integer that is at least two, and the M sets of code pattern sensing elements include at least first and second sets of code pattern sensing elements that comprise at least N members spaced along the measuring axis direction to sense at least N consecutive code bits on the adjacent portion of the scale and provide corresponding first and second sets of code detector signals; and
   wherein:
      Wcode is larger than Wf and at most M*Wf;
      the sets of code pattern sensing elements are located along the measuring axis direction at respective code alignment positions configured such that as the absolute position code pattern moves in a single direction along the measuring axis direction relative to the detector it moves by successive alignment intervals to align or realign with each successive alignment position, and each successive alignment interval is at most Wf; and
      the electronic absolute position encoder further comprises a signal processing configuration that inputs the M respective sets of code detector signals and determines the absolute position of the adjacent portion of the scale with a coarse resolution at least as fine as Wf based on the M respective sets of code detector signals, and further determines the absolute position of the adjacent portion of the scale with a fine resolution that is at least as fine as 0.1*Wf based at least on the spatially periodic detector signals.

2. The electronic absolute position encoder of claim 1, wherein M is two.

3. The electronic absolute position encoder of claim 2, wherein the first and second sets of code detector signals each provide at least N code detector signals.

4. The electronic absolute position encoder of claim 1, wherein M is at least three.

5. The electronic absolute position encoder of claim 1, each of the M respective sets of code detector signals provides at least N code detector signals.

6. The electronic absolute position encoder of claim 1, wherein Wf is at most 2 mm, and N is at most 8.

7. The electronic absolute position encoder of claim 6, wherein N is at most 6.

8. The electronic absolute position encoder of claim 6, wherein M is two and Wcode is at least 1.25 Wf and at most 1.75*Wf.

9. The electronic absolute position encoder of claim 6, wherein Wf is at most 1 mm.

10. The electronic absolute position encoder of claim 6, wherein the detector has a dimension Ldet along the measuring axis direction that is at most 20 millimeters.

11. The electronic absolute position encoder of claim 6, wherein Wf is at most 1 mm and N is at most 6.

12. The electronic absolute position encoder of claim 1, wherein each successive alignment interval is approximately the same.

13. The electronic absolute position encoder of claim 12, wherein each successive alignment interval is approximately Wcode/M.

14. The electronic absolute position encoder of claim 1, wherein the detector and the scale are configured as an eddy current transducer which operates by generating changing magnetic fields.

* * * * *

UNITED STATES PATENT AND TRADEMARK OFFICE
CERTIFICATE OF CORRECTION

PATENT NO. : 10,724,877 B2
APPLICATION NO. : 15/790703
DATED : July 28, 2020
INVENTOR(S) : James Allen Hitchman et al.

It is certified that error appears in the above-identified patent and that said Letters Patent is hereby corrected as shown below:

In the Claims

Column 17, Claim 8, Line 2:
"wherein M is two and Wcode is at least 1.25 Wf and at most," should read, --wherein M is two and Wcode is at least 1.25*Wf and at most--

Signed and Sealed this
Tenth Day of November, 2020

Andrei Iancu
*Director of the United States Patent and Trademark Office*